(12) United States Patent
Sako et al.

(10) Patent No.: US 9,298,969 B2
(45) Date of Patent: Mar. 29, 2016

(54) INFORMATION PROCESSING DEVICE AND STORAGE MEDIUM, FOR REPLACING A FACE IMAGE

(71) Applicant: SONY CORPORATION, Tokyo (JP)

(72) Inventors: Yoichiro Sako, Tokyo (JP); Akira Tange, Tokyo (JP); Takatoshi Nakamura, Kanagawa (JP); Kazuhiro Watanabe, Tokyo (JP); Kohei Asada, Kanagawa (JP); Kazuyuki Sakoda, Chiba (JP); Takayasu Kon, Tokyo (JP); Yuki Koga, Tokyo (JP); Tomoya Onuma, Shizuoka (JP); Hiroyuki Hanaya, Kanagawa (JP); Mitsuru Takehara, Tokyo (JP); Kazunori Hayashi, Tokyo (JP); Yasunori Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 14/055,009

(22) Filed: Oct. 16, 2013

(65) Prior Publication Data

US 2014/0112534 A1    Apr. 24, 2014

(30) Foreign Application Priority Data

Oct. 23, 2012 (JP) .................................. 2012-233709

(51) Int. Cl.
G06K 9/00 (2006.01)
G06F 21/62 (2013.01)
G06T 11/60 (2006.01)

(52) U.S. Cl.
CPC ........ *G06K 9/00221* (2013.01); *G06F 21/6245* (2013.01); *G06T 11/60* (2013.01)

(58) Field of Classification Search
None
See application file for complete search history.

(56) References Cited

U.S. PATENT DOCUMENTS

| 2007/0172155 A1* | 7/2007 | Guckenberger | 382/305 |
| 2011/0135153 A1* | 6/2011 | Tsurumi et al. | 382/103 |
| 2012/0219180 A1* | 8/2012 | Mehra | 382/103 |

FOREIGN PATENT DOCUMENTS

| JP | 2001-127990 | 5/2001 |
| JP | 2005-236464 | 9/2005 |

OTHER PUBLICATIONS

Dmitri Bitouk, Neeraj Kumar, Samreen Dhillon, Peter Belhumeur, and Shree K. Nayar Face Swapping: Automatically Replacing Faces in Photographs, Aug. 2008, ACM Transactions on Graphics, vol. 27, No. 3, Article 39.*

* cited by examiner

*Primary Examiner* — Siamak Harandi
(74) *Attorney, Agent, or Firm* — Paratus Law Group, PLLC

(57) ABSTRACT

There is provided an information processing device including a detection unit that detects a face image region in an image, a determination unit that determines a human attribute of at least one face image in the face image region detected by the detection unit, and a face image replacement unit that replaces the at least one face image with a natural face image of another person according to the human attribute determined by the determination unit.

20 Claims, 8 Drawing Sheets

FIG.2
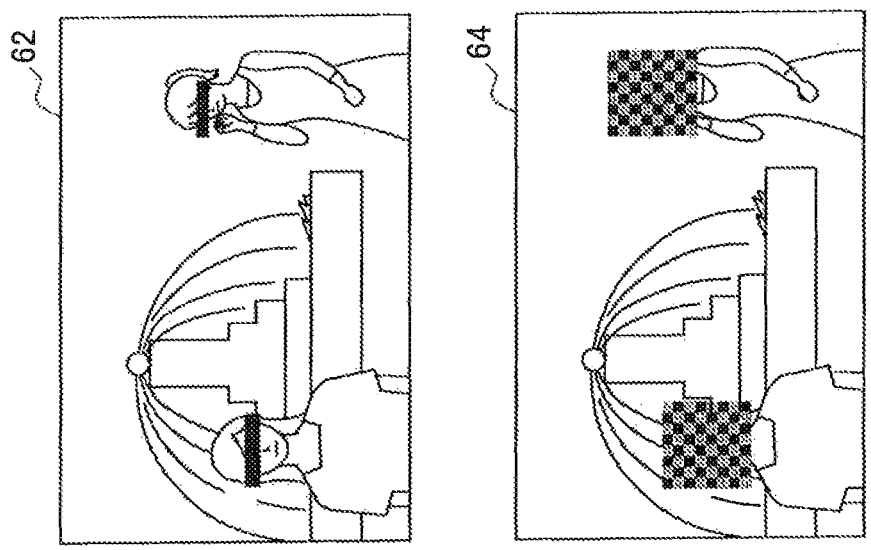
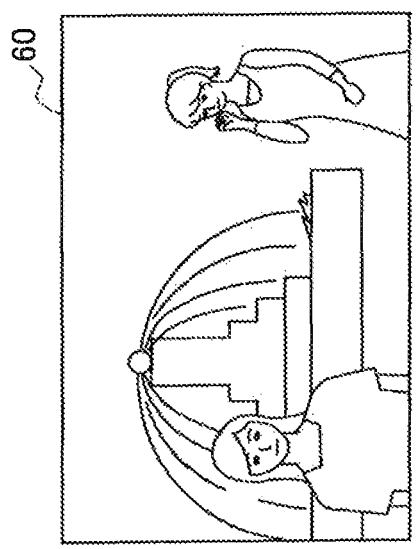

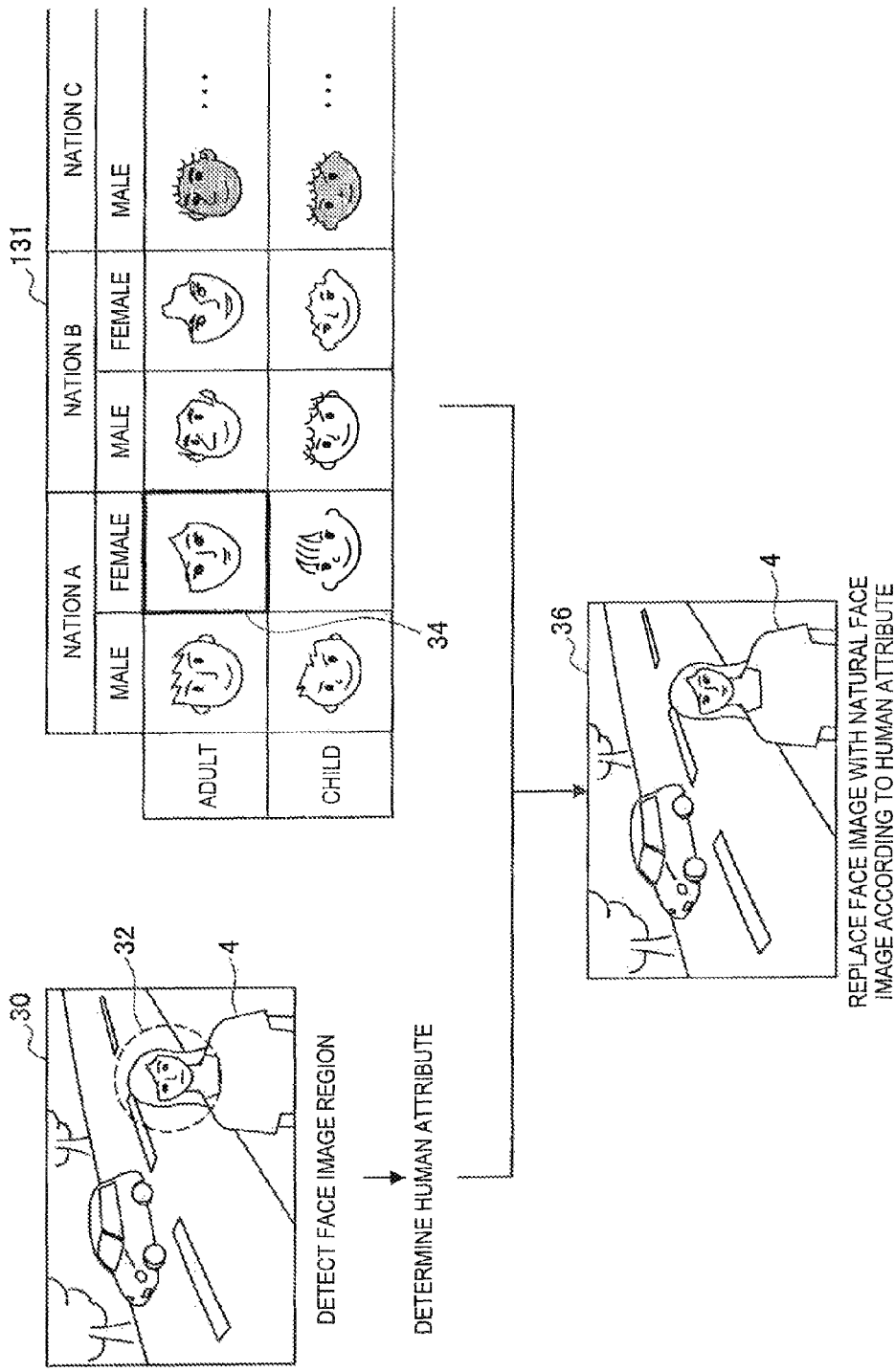

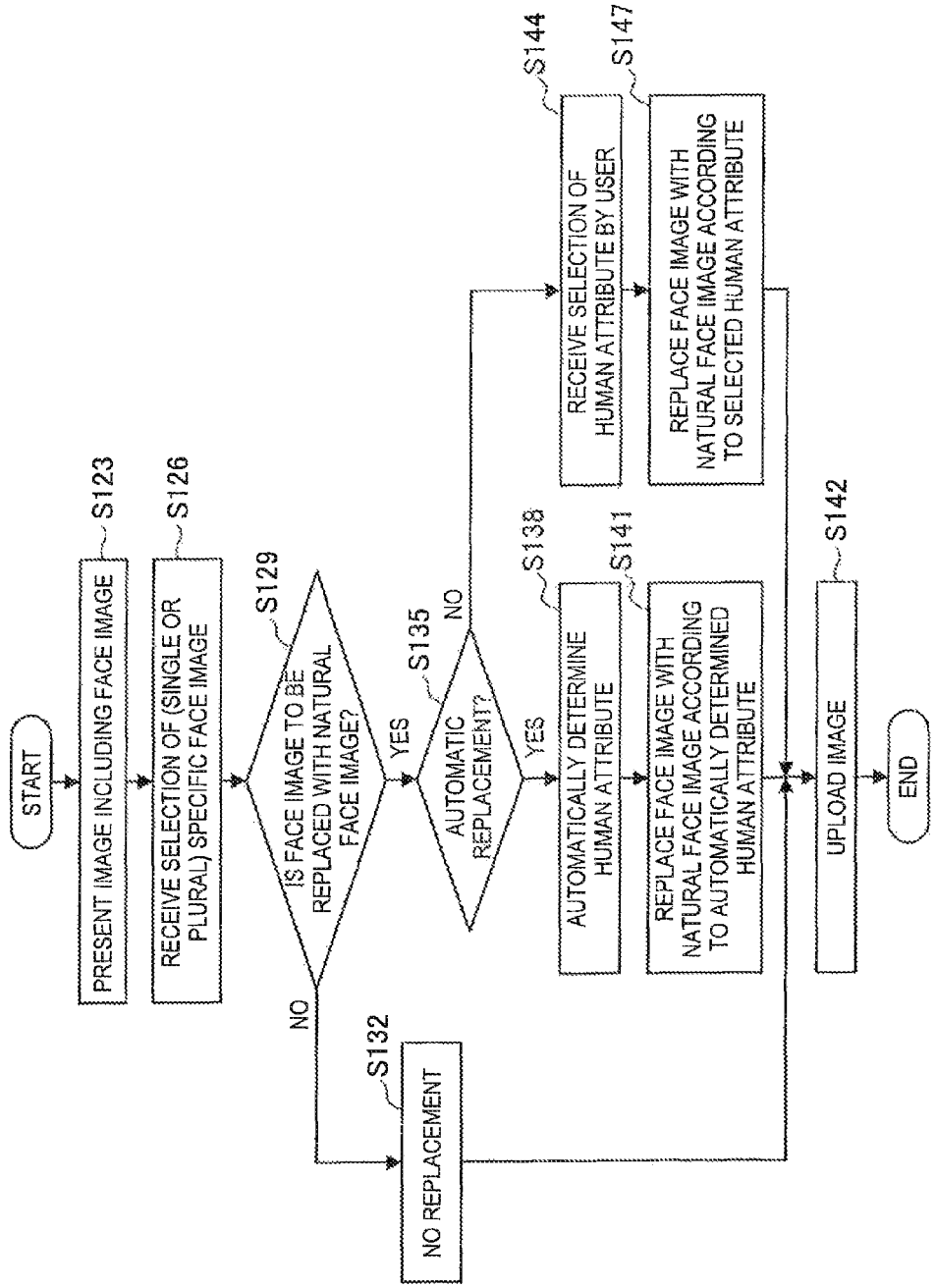

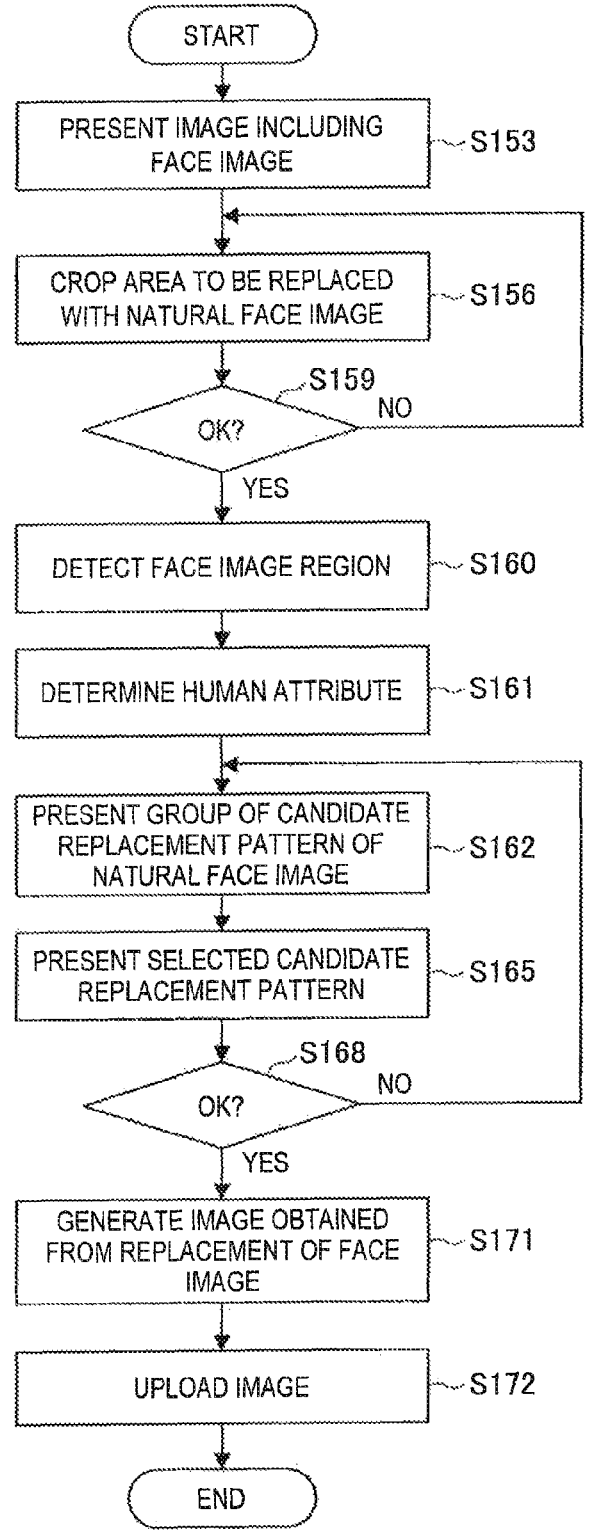

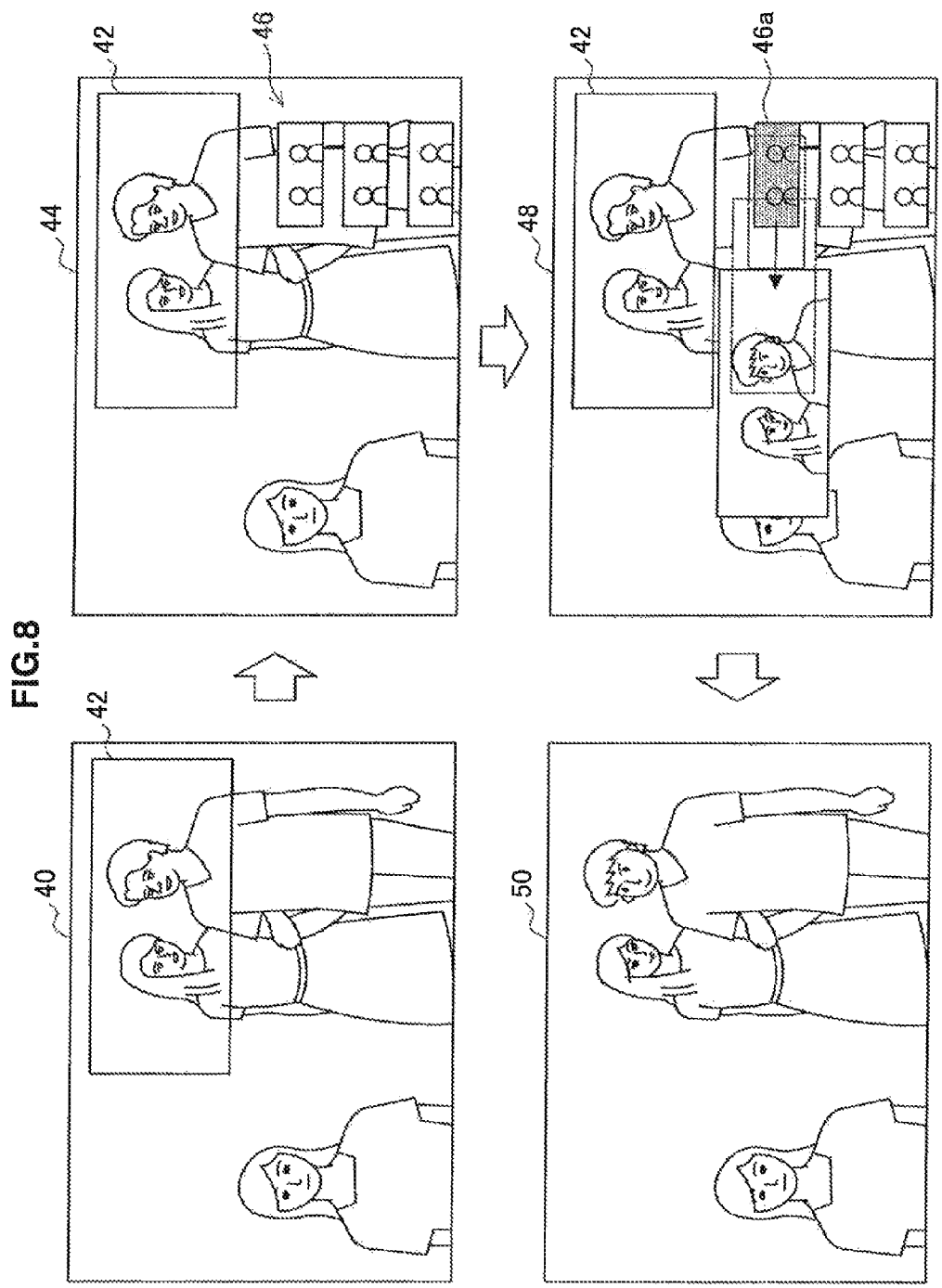

INFORMATION PROCESSING DEVICE AND STORAGE MEDIUM, FOR REPLACING A FACE IMAGE

CROSS REFERENCE TO RELATED APPLICATIONS

This application claims the benefit of Japanese Priority Patent Application JP 2012-233709 filed Oct. 23, 2012, the entire content of which is incorporated herein by reference.

BACKGROUND

The present disclosure relates to an information processing device and a storage medium.

As transmission of a large amount of data at a high-speed rate has become possible along with the development of communication technologies in recent years, various kinds of information communication services have been provided. For example, users can share their photographed images on social relation sites such as SNS (Social Networking Service) sites, or can transmit their photographed images to transmission destinations via predetermined networks in network simulation games. In such a case, when a user does not want to reveal his or her own face, or the like, a part of a photographed image may be processed and then transmitted on a network for the sake of protection of privacy.

As a technology relating to protection of privacy that is used to protect portrait rights of a person appearing in an image, for example, Japanese Unexamined Patent Application Publication No. 2001-127990 has been proposed. Japanese Unexamined Patent Application Publication No. 2001-127990 discloses a technology in which, when a photographed portrait image is transmitted to a desired transmission destination in real time, an image recognizing device breaks down a person and a background in the image into individual objects, and an image processing unit converts them into other images for each object. The publication describes that the other images are images of, for example, composite sketches or facial caricatures.

In addition, Japanese Unexamined Patent Application Publication No. 2005-236464 discloses a technology in which, in a video distribution system of a surveillance camera, persons and regions with no persons are separated, and while video images of goods are included, video images that do not include images of visitors to a store (video images in which the visitors are mosaicked) are distributed. Accordingly, while protecting portrait rights and privacy of the visitors to the store, distribution of video images that enable the situation of the store to be ascertained is possible.

SUMMARY

In the technologies disclosed in Japanese Unexamined Patent Application Publication Nos. 2001-127990 and 2005-236464, however, even though privacy can be protected, an actual video image is unnatural due to such mosaicked portions, composite sketches, caricatures, or the like included therein, which causes a feeling of discomfort.

Thus, it is desirable to propose a novel and improved information processing device and storage medium that can protect privacy by converting a face image of a person without causing a feeling of discomfort.

According to an embodiment of the present disclosure, there is provided an information processing device including a detection unit that detects a face image region in an image, a determination unit that determines a human attribute of at least one face image in the face image region detected by the detection unit, and a face image replacement unit that replaces the at least one face image with a natural face image of another person according to the human attribute determined by the determination unit.

According to an embodiment of the present disclosure, there is provided a non-transitory computer-readable storage medium having a program stored therein, the program causing a computer to operate as a detection unit that detects a face image region in an image, a determination unit that determines a human attribute of at least one face image in the face image region detected by the detection unit, and a face image replacement unit that replaces the at least one face image with a natural face image of another person according to the human attribute determined by the determination unit.

According to embodiments of the present disclosure described above, it is possible to protect privacy by converting a face image of a person without causing a feeling of discomfort.

BRIEF DESCRIPTION OF THE DRAWINGS

FIG. 2 is a diagram exemplifying general privacy protection methods for a face image;

FIG. 5 is a diagram for describing face image replacement according to the embodiment in detail;

FIG. 6 is a flowchart showing a second face image replacement process according to the embodiment;

FIG. 7 is a flowchart showing a third face image replacement process according to the embodiment; and FIG. 8 is a diagram illustrating a display example of each image presented from a server to a user terminal according to the embodiment.

DETAILED DESCRIPTION OF THE EMBODIMENT(S)

Figure 1:
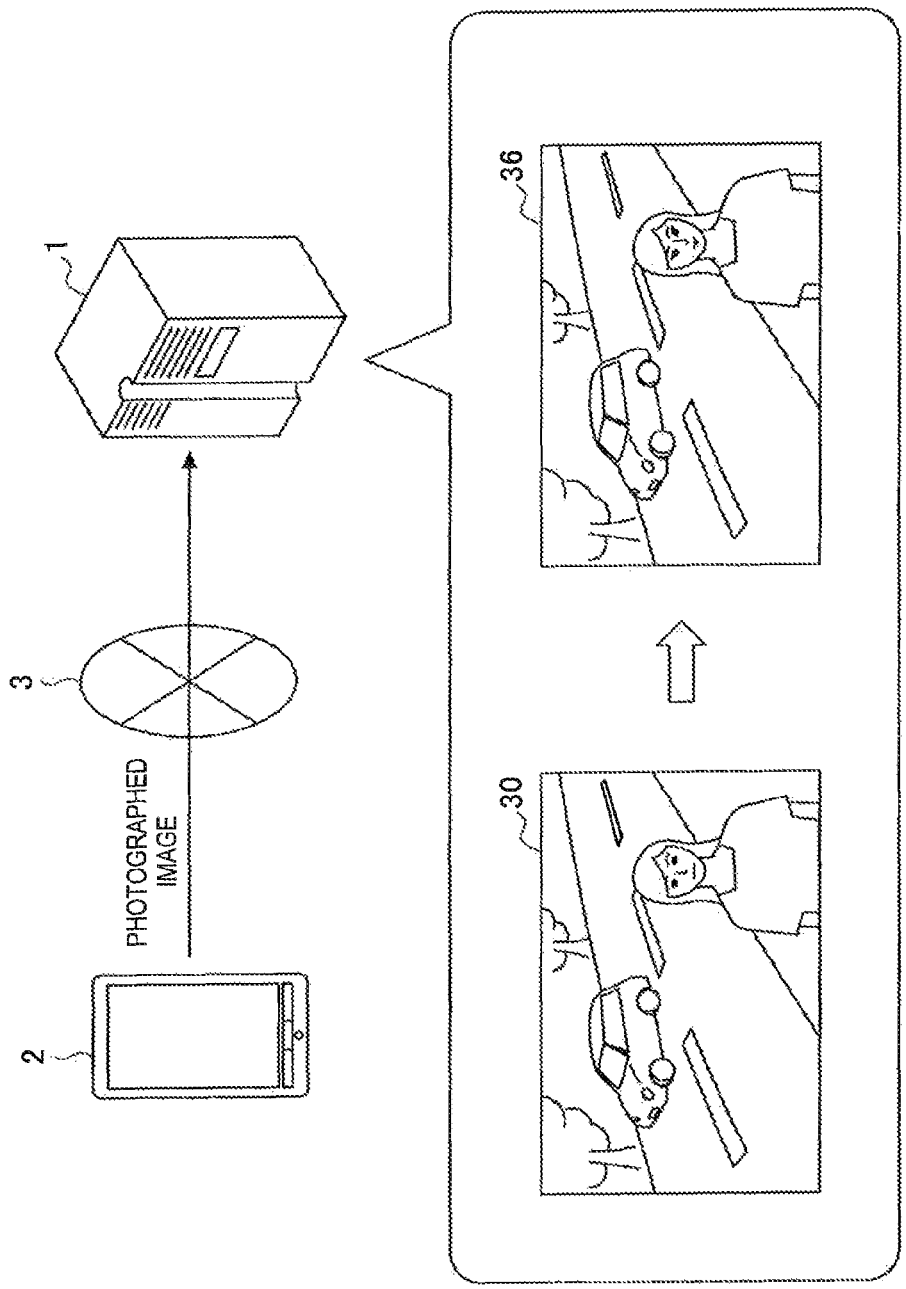
FIG. 1 is a diagram for describing an overview of an image processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.

1. Overview of an image processing system according to an embodiment of the present disclosure
2. Internal configuration example of a server
3. Face image replacement process
3-1. First face image replacement process
3-2. Second face image replacement process
3-3. Third face image replacement process
4. Conclusion

1. Overview of an Image Processing System According to an Embodiment of the Present Disclosure First, an overview of an image processing system according to an embodiment of the present disclosure will be described with reference to FIG. 1. As illustrated in FIG. 1, the image processing system according to the embodiment of the present disclosure includes a server 1 and a user terminal 2. In addition, the server and the user terminal 2 can be connected to each other via a network 3.

The user terminal 2 is a communication terminal that a user uses, and can be connected to the network 3 in a wireless or wired manner. In addition, the user terminal 2 may be a mobile telephone terminal, a digital camera, a video camera, a PDA (Personal Digital Assistant), a PC (Personal Computer), a portable game device, or the like, rather than a smartphone as illustrated in FIG. 1. The user can upload an actual image (photographed image) photographed using the user terminal 2 or a photographed image included in the user terminal 2 on a service site for SNSs or blog services via the network 3.

Here, when a user does not want to reveal his or her face appearing in the photographed image to the public or when the face of another person appears in the photographed image, the user generally attempts to protect the privacy by performing a process on the image and then uploading it so as to make the face unrecognizable. For example, in order to protect privacy of a person appearing in a photographed image 60 as illustrated in FIG. 2, occluding the part showing the eyes of the persons with censor bars as in a processed image 62, or mosaicking the faces of the persons as in a processed image 64 has been known.

However, if such processing is performed on an actual image, although privacy can be protected with such censor bars and mosaicking, the image looks unnatural, causing a feeling of discomfort.

Thus, focusing on the above-described circumstance, the image processing system according to each embodiment of the present disclosure has been created. According to the image processing system according to each embodiment of the present disclosure, privacy can be protected by converting a face image of a person so as not to arouse a feeling of discomfort.

To be specific, in the server 1, an image 36 is generated by replacing a face region of a person appearing in a photographed image 30 transmitted from the user terminal 2 with another natural face image according to human attributes of the person, as illustrated in FIG. 1. A human attribute is, for example, the age or sex of a person, and the server 1 can generate the natural image 36 that arouses little feeling of discomfort by replacing with another natural face image of the same sex as the person appearing in the photographed image 30. As described, by replacing the face image of the person with another natural face image according to human attributes, an image that arouses little unnatural feeling can be generated while protecting the privacy of the person appearing in the photographed image.

Note that, in the present specification, a natural face image means an actual image (natural image) obtained by taking the face of an existing person as it is or an average face image (composite image) generated from actual images of the faces of a plurality of existing persons.

Hereinabove, the overview of the image processing system according to the embodiment of the present disclosure has been described. Next, an internal configuration example of the server 1 included in the image processing system will be described in detail with reference to FIG. 3.

2. Internal Configuration Example of a Server

Figure 3:
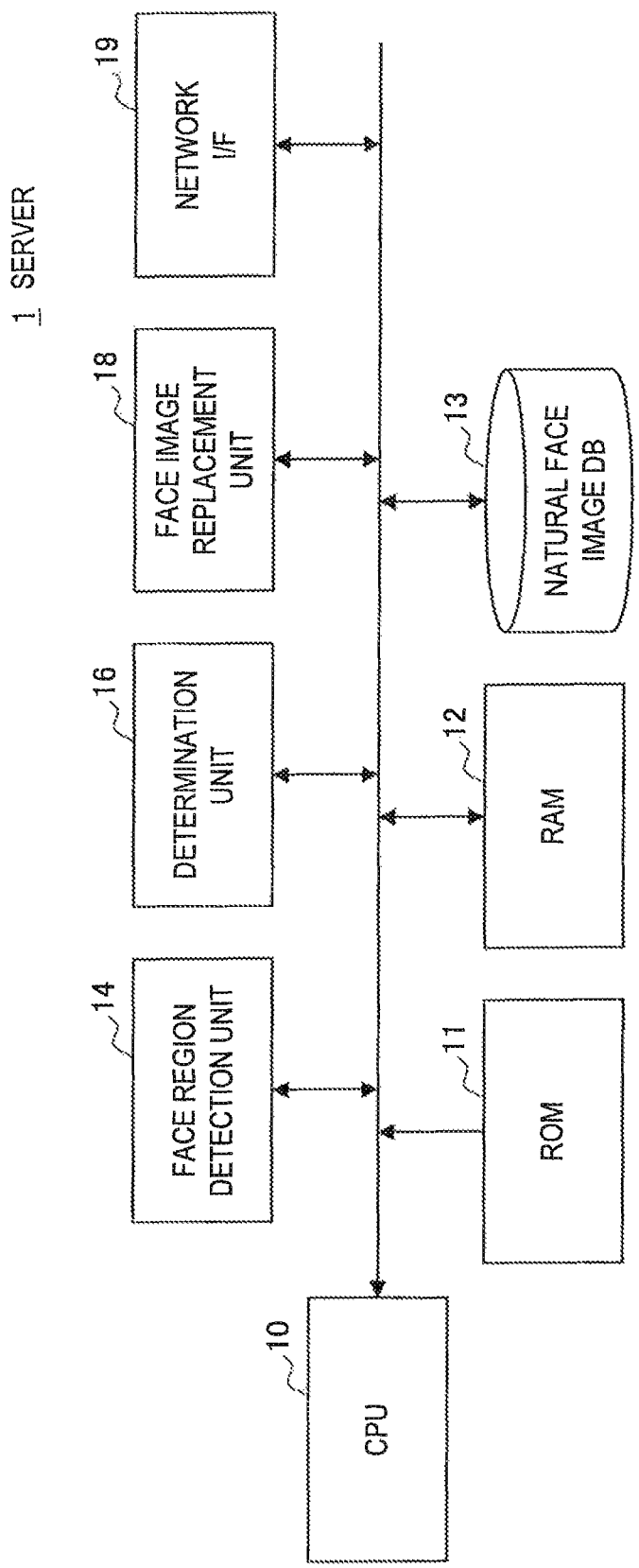
FIG. 3 is a block diagram illustrating an internal configuration example of a server according to the embodiment.

FIG. 3 is a block diagram illustrating a configuration of the server 1 according to the present embodiment. As illustrated in FIG. 3, the server 1 has a CPU (Central Processing Unit) 10, a ROM (Read Only Memory) 11, a RAM (Random Access Memory) 12, a natural face image DB (Database) 13, a face region detection unit 14, a determination unit 16, a face image replacement unit 18, and a network interface (I/F) 19. Hereinafter, a configuration of each unit will be described.

(Natural Face Image DB 13)

The natural face image DB 13 is a storage unit in which natural face images are stored. In the present specification as described above, a natural face image may be an actual image, or may be an average face image (composite image) generated from a plurality of actual images. An actual image is a photographed image obtained by photographing the face of a person who permits his or her face to be revealed to the public. In addition, an average face image may be an average face image generated for each human attribute such as sex, age, race, skin color, hair color, eye color, and body type. In addition, wearing or non-wearing of accessories such as eyewear, hats, earmuffs, headphones, or earphones (hereinafter referred to also as wearing or non-wearing of eyewear, or the like) may be added to the human attributes. This is because a person's wearing of such accessories over his or her face and on his or her head affects his or her facial impression.

In addition, on a natural face image, an indication of being a replaced image may be marked. Being a replaced image may be expressed by, for example, adding a black point at a predetermined position on the face image.

In addition, a natural face image may be an image that includes at least a part of a face, or may be a natural image of a face part, for example, an eye, a nose, or a mouth.

Note that an example of a natural face image stored in the natural face image DB 13 will be described with reference to FIG. 5 later.

(Face Region Detection Unit 14)

The face region detection unit 14 detects a face image region in an image transmitted from the user terminal 2. To be specific, the face region detection unit 14, for example, recognizes a face by analyzing an image, and thereby detects an image region that includes at least a part of the face. In addition, the face region detection unit 14 may detect a face photographed at a size equal to or greater than a predetermined size set in advance as a face image region. In addition, the face region detection unit 14 may detect a face image region from an area in an image designated by a user.

(Determination Unit 16)

The determination unit 16 determines a human attribute of at least one face image in the face image region detected by the face region detection unit 14. To be specific, the determination unit 16 may determine a human attribute based on a face image, or based on a whole image (an image of a body including the face image). Here, a human attribute is the sex, age (generation), race, skin color, hair color, eye color, nationality, body type, or the like of a person, and wearing or non-wearing of eyewear, or the like may be added thereto. In addition, the determination unit 16 may determine a human attribute in such a way that an image of a face or a body is extracted from an image, pattern-matching with a pattern for attribute determination registered in advance is performed on the image, and then the face, attire, and the like are analyzed.

(Face Image Replacement Unit 18)

The face image replacement unit 18 replaces the face image region detected by the face region detection unit 14 with a natural face image of another person according to the human attribute determined by the determination unit 16. To be specific, for example, the face image replacement unit 18 extracts a natural face image of a person having the same attribute as the human attribute determined by the determination unit 16 (for example, having the same sex, age, race, skin color, hair color, or eye color) from the natural face image DB 13, and replaces the face image region in the image with the natural face image. In this manner, since the face image region of the image is converted into another natural face image such that the person appearing in the image is not specified, the natural face image is also called an anonymous face image. In addition, by replacing the face image region with the natural face image of a person having the same attribute as the human attribute determined by the determination unit 16, the face image replacement unit 18 can generate a replaced image that is more natural and arouses little feeling of discomfort. Note that, when a person of a face image wears eyewear in an image, the face image replacement unit 18 may replace the image with an eyewear-wearing face image, or may replace the image with a face image without eyewear, or the like and then perform image processing thereon so as to make the person wear eyewear, or the like.

In addition, a replacement process by the face image replacement unit 18 may be a method of overwriting a natural face image on image data (original image) transmitted from the user terminal 2, or may be a method of managing a natural face image superimposed on a face region as a separate layer from the original image.

In addition, the face image replacement unit 18 may extract a natural face image that looks more natural and arouses little feeling of discomfort during replacement according to the state of illumination during photographing of the original image, the location of photographing, image quality, and the like, in addition to the human attribute. To be specific, when natural light is used for illumination of photographing and the environment is very bright, for example, the face image replacement unit 18 extracts a natural face image that is likewise photographed in a bright environment in which natural light is used.

In addition, the face image replacement unit 18 replaces a face image with a natural face image of which at least one of a size, an orientation, a facial expression, and the like matches that of the face image appearing in an original image (photographed image) so that an image obtained from replacement with a natural face image causes little feeling of discomfort.

In addition, according to a majority race residing in a photographing location (having the nationality of the photographing location), the face image replacement unit 18 may extract a natural face image of the race (nationality). Thus, when a person visits a nation B on tour, for example, and photographs an image in which a person from the same nation, a nation A, is photographed, by replacing the image of the person from the nation A with a natural face image of a native of the nation B, privacy of the photographed person can be protected, and it will be obvious that the replaced image is photographed in the visited place of the nation B. In such a case, the face image replacement unit 18 can generate the image that looks more natural and arouses little feeling of discomfort by extracting the natural face image of a native of the nation B having the same human attributes such as the sex, age, and the like of the person from the nation A photographed in the original image.

Note that information on the state of illumination during photographing, the location of photographing, image quality, and the like may be determined by analyzing the original image, or may be determined from meta data added to the original image.

(Network I/F 19)

The network I/F 19 is a communication module for performing transmission and reception of data between the user terminal 2 via the network 3. For example, the network I/F 19 according to the present embodiment receives a photographed image from the user terminal 2. In addition, the network I/F 19 can also upload an image obtained from the server 1 by performing a replacement process on a face image by the server 1 on a predetermined service site via the network 3.

(CPU 10, ROM 11, and RAM 12)

The CPU 10 is a control unit that controls each constituent element of the server 1. The CPU 10 controls each constituent element according to a software program stored in the ROM 11. To be specific, the CPU 10 executes control to upload, for example, an image that has undergone a replacement process by the face image replacement unit 18 on a predetermined service site. In addition, the ROM 11 stores the software program, and the like necessary for the CPU 10 executing the control. In addition, the RAM 12 is used as a work area when the CPU 10 executes the control according to the software program stored in the ROM 11.

Hereinabove, the configuration of the server 1 according to the present embodiment has been described in detail. Next, several examples of a face image replacement process according to the present embodiment will be described.

3. Face Image Replacement Process (3-1. First Face Image Replacement Process)

Figure 4:
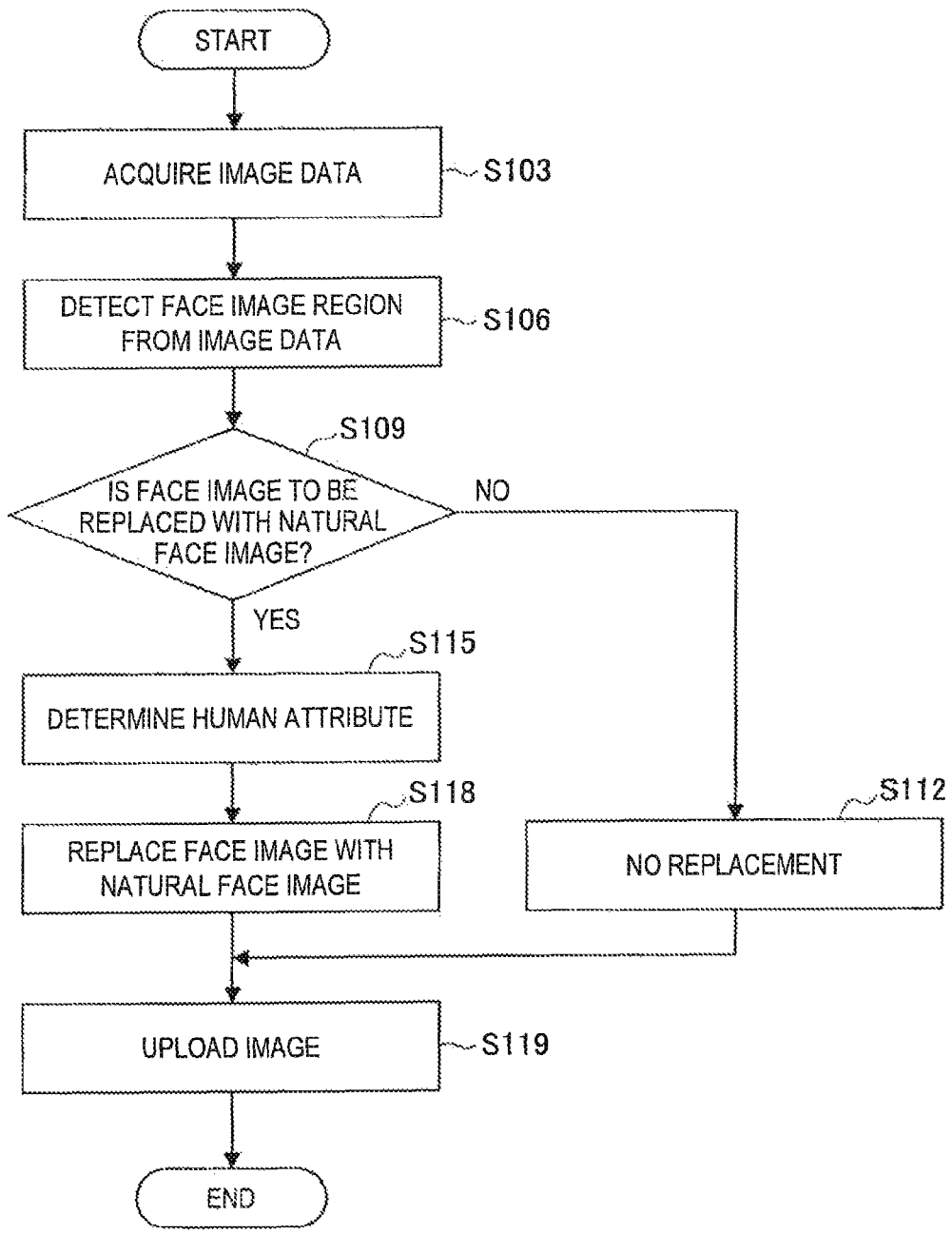
FIG. 4 is a flowchart showing a first face image replacement process according to the embodiment.

FIG. 4 is a flowchart showing a first face image replacement process according to the present embodiment. As shown in FIG. 4, the server 1 acquires (receives) image data from the user terminal 2 in Step S103.

Next, the face region detection unit 14 of the server 1 detects a face image region from the image data in Step S106. In this case, the face region detection unit 14 may detect a face image region in a size equal to or greater than a predetermined size without detecting a face image that is too small to specify a person. Herein, FIG. 5 illustrates a diagram for describing face image replacement according to the present embodiment in detail. As illustrated in FIG. 5, the face region detection unit 14 detects a face image region 32 in the photographed image 30 transmitted from the user terminal 2.

Then, the CPU 10 of the server 1 determines whether or not the image is to be replaced with a natural face image in Step S109. To be specific, the CPU 10 may determine replacement with a natural face image when there is a replacement instruction from a user, or when anonymity on a service site on which the image is going to be uploaded is not reliably ensured.

Next, when replacement is determined not to be performed (NO in S109), the server 1 does not perform replacement of the natural face image in Step S112, and then uploads the image transmitted from the user terminal 2 on a predetermined service site without change in Step S119.

On the other hand, when replacing with the natural face image is determined (YES in S109), the determination unit 16 determines a human attribute of the person in the face image region detected by the face region detection unit 14 in Step S115. To be specific, the determination unit 16 determines human attributes of the person 4 in the face image region 32 detected from the photographed image 30 as illustrated in FIG. 5. In this case, the determination unit 16 extracts, for example, an image of the face or the body of the person 4, performs pattern matching with a pattern for attribute determination registered in advance, and thereby can determine human attributes such as "nation A," "female," and "adult."

Next, in Step S118, the face image replacement unit 18 extracts a natural face image from the natural face image DB 13 according to the human attributes determined by the determination unit 16, and replaces the face image region detected by the face region detection unit 14 with the extracted natural face image. To be specific, as illustrated in FIG. 5, the natural face image having the same attributes as the human attributes determined by the determination unit 16 is extracted from a plurality of pieces of natural face image data 131 stored in the natural face image DB 13. The pieces of the natural face image data 131 are classified for each human attribute as illustrated in FIG. 5, and the face image replacement unit 18 extracts a natural face image 34 satisfying all of the human attributes of the person 4 including "nation A," "female," and "adult." Then, the face image replacement unit 18 replaces the face image region 32 of the photographed image 30 with the extracted natural face image 34, and thereby generates an image 36. As illustrated in FIG. 5, replacement of a face image may be performed by replacing only the face with the natural face image 34 using the head part (including the whole hairdo) of the person 4 appearing in the original image (photographed image 30) as it is, or replacing the image with a natural face image including the whole hairdo.

Further, the face image replacement unit 18 may replace the whole person 4 including the body with a natural portrait image including a face and a body. When the photographing location of the photographed image 30 is the nation B, for example, and when the person 4 is determined to have attributes of a person of the nation A, the face image replacement unit 18 may replace the whole person 4 with a natural portrait image of a native of the nation B.

Next, in Step S119, the server 1 uploads the image obtained from the replacement with the natural face image performed by the face image replacement unit 18 on a predetermined service site.

(3-2. Second Face Image Replacement Process)

In the first face image replacement process described above, the determination unit 16 automatically determines human attributes of a person of a face image region, however, the face image replacement process according to the present embodiment is not limited thereto, and for example, a user may designate human attributes arbitrarily. Hereinafter, a face image replacement process in which a user can arbitrarily designate human attributes will be described in detail with reference to FIG. 6.

FIG. 6 is a flowchart showing a second face image replacement process according to the present embodiment. As illustrated in FIG. 6, the server 1 presents an image including a face image to the user terminal 2 in Step S123.

Next, in Step S126, the server 1 receives selection of a single or a plurality of specific face images by a user. In other words, the user operates the user terminal 2 to select a face image region for the face image that the user wants to replace from the presented image including the face image.

Next, in Step S129, the server 1 determines whether or not the face image is to be replaced with a natural face image. To be specific, the CPU 10 may determine to replace the face image with a natural face image when there is a replacement instruction from the user.

Next, when replacement is determined not to be performed (NO in S129), the server 1 does not replace the face image with the natural face image in Step S132, and then uploads the image including the face image on a predetermined service site without change in Step S142.

On the other hand, when replacing the face image with the natural face image is determined (YES in S129), the CPU 10 determines whether or not automatic replacement is to be performed in Step S135. To be specific, the CPU 10 determines automatic replacement to be performed when there is no instruction from the user, automatic replacement is determined, and determines manual replacement to be performed when there is an instruction of manual replacement from the user.

Next, when automatic replacement is determined (YES in S135), in Step S138, the determination unit 16 automatically determines human attributes of the person in the face image region selected by the user in S126 described above.

Next, in Step S141, the face image replacement unit 18 extracts a natural face image from the natural face image DB 13 according to the human attributes determined by the determination unit 16, and replaces the face image region detected by the face region detection unit 14 with the extracted natural face image.

Then, in Step S142, the server 1 uploads the image obtained from the replacement with the natural face image by the face image replacement unit 18 on a predetermined service site.

On the other hand, when manual replacement is determined (NO in S135), the CPU 10 receives the selection of the human attributes by the user in Step S144. In other words, the user operates the user terminal 2 to select, for example, the nationality, the age, the sex, and the like as the human attributes for replacement of the selected face image region.

Next, in Step S147, the face image replacement unit 18 extracts a natural face image from the natural face image DB 13 according to the human attributes selected by the user, and replaces the face image region selected by the user with the extracted natural face image.

Then, in Step S142, the server 1 uploads the image obtained from the replacement with the natural face image by the face image replacement unit 18 on a predetermined service site.

As described above, the natural face image replacing the face image region in the image can be designated by the user manually selecting the human attributes.

(3-3. Third Face Image Replacement Process)

In the first and second face image replacement processes described above, the face image replacement unit 18 automatically performs extraction and replacement with a natural face image according to human attributes, however, the face image replacement process according to the present embodiment is not limited thereto. For example, the face image replacement unit 18 may extract a plurality of natural face images according to human attributes, present them to a user, and then perform a process of replacing with a natural face image selected by the user. Hereinafter, a natural face image replacement process in which a plurality of natural face images are presented to a user will be described in detail with reference to FIGS. 7 and 8.

FIG. 7 is a flowchart showing a third face image replacement process according to the present embodiment. As shown in FIG. 7, in Step S153, the server 1 presents an image including a face image to the user terminal 2.

Next, in Step S156, the server 1 crops a replacement area with a natural face image. To be specific, the server 1 may receive selection of an area of the face image to be replaced from the presented image including the face image according to an instruction of a user, or may automatically present an area including the face image as a cropping portion. Here, FIG. 8 is a diagram of a display example of each image presented by the server 1 to the user terminal 2 according to the present embodiment. First, the server 1 presents, to the user terminal 2, an area 42 cropped as an area of the face image to be replaced out of the image including the face image presented to the user as shown in a screen 40 of FIG. 8.

Next, in Step S159, the server 1 determines whether or not the cropped area 42 is OK, according to a user operation.

When the area 42 illustrated in FIG. 8 is OK, for example, the user clicks an OK button (not illustrated) displayed in the user terminal 2 to perform a decision process.

Next, when the cropped area is OK (YES in S159), the face region detection unit 14 detects two face image regions from the area 42 in Step S160.

Next, in Step S161, the determination unit 16 determines human attributes of each person in the two face image regions detected by the face region detection unit 14.

Next, in Step S162, the face image replacement unit 18 extracts one or more natural face image according to human attributes of each person determined by the determination unit 16 from the natural face image DB 13, and then presents the images to the user terminal 2 as a group of candidate replacement patterns. To be specific, as illustrated in the screen 44 of FIG. 8, the group of candidate replacement patterns 46 of the natural face images is displayed in the user terminal 2.

Next, in Step S165, the face image replacement unit 18 enlarges and presents candidate replacement patterns selected by the user from the group of candidate replacement patterns 46. To be specific, as illustrated in a screen 48 of FIG. 8, when a candidate replacement pattern 46a among the group of candidate replacement patterns 46 is selected, the server 1 enlarges the candidate replacement pattern 46a and presents it to the user terminal 2. Note that the candidate replacement pattern 46a is a natural face image according to at least a human attribute such as the sex, or the age (generation) as illustrated in FIG. 8, and the orientation of a face also serves as an attribute of a candidate natural face image for each face image in the area 42.

Next, in Step S168, the server 1 determines whether or not the presented candidate replacement pattern is OK according to a user operation. When the candidate replacement pattern 46a illustrated in the screen 48 of FIG. 8 is OK, the user clicks the OK button (not illustrated) displayed in the user terminal 2 to perform a decision process.

Next, when the candidate replacement pattern is decided (YES in S168), in Step S171, the face image replacement unit 18 generates an image obtained by performing replacement with the candidate replacement pattern 46a of a natural face image as illustrated in a screen 50 of FIG. 8, and presents the image to the user terminal 2.

Then, in Step S172, the server 1 uploads the image obtained by performing replacement with the natural face image by the face image replacement unit 18 on a predetermined service site.

As described hereinabove, in the face image replacement process according to the present embodiment, a plurality of natural face images are presented as a group of candidate replacement patterns, and a user can select any candidate replacement pattern.

4. Conclusion

As described above, in the image processing (face image replacement process) system according to the present embodiment, by replacing a face region detected from an image with a natural face image according to human attributes of a person in the face region, a replaced image that is natural and gives little feeling of discomfort can be generated while protecting the privacy of the person.

Particularly, such protection of privacy has become ever more important recently as photographed images including face images are actively uploaded on service sites of SNSs, blog services, and the like.

In addition, there is an increasing possibility of being photographed without one's awareness since surveillance cameras have been installed in most places and map services for displaying actual images of roads have been distributed. In such cases, by replacing face image regions with other natural face images, it is advantageous to generate replaced images that are natural and give little feeling of discomfort while protecting privacy.

Further, it is expected to be useful in realizing a new communication system in which a huge amount of image sensors, microphones, speakers and the like are widespread throughout the world so as to be used as means for realizing expansion of physical capabilities of users, and accordingly, communication terminals that individuals possess are no longer necessary. If such a communication system is realized, there is an increasing possibility of being photographed without one's awareness due to such image sensors (cameras) spread in a wide range. In such a case, however, by replacing face image regions with other natural face images, it is advantageous to generate replaced images that are natural and give little feeling of discomfort while protecting privacy.

Hereinabove, exemplary embodiments of the present disclosure has been described in detail with reference to the accompanying drawings, but the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the face image replacement unit 18 may extract a natural face image according to the image quality and resolution of an original image (photographed image) to be replaced.

In addition, when it is difficult to extract a natural face image according to human attributes of a person whose face image region is detected, for example, the face image replacement unit 18 may delete the image of the person from an original image, or replace the whole image of the person with another natural portrait image.

In addition, an image that has undergone a replacement process with a natural face image may be set to return to an original image (photographed image) before replacement when a predetermined condition is satisfied. A predetermined condition is a case in which there is an instruction of returning a replaced image to an original image prior to replacement from a person who appears in the photographed image, or the like.

In addition, a natural face image may be a photographed image (actual image) obtained by photographing the face of a person who permits his or her face to be revealed to the public. Thus, the server 1 may receive an actual face image of the person who wants to allow his or her own face to be used and store the image in the natural face image DB 13.

In addition, in the present embodiment, the server 1 is used as an information processing device executing the face image replacement process, however, the information processing device according to the present embodiment is not limited to the server 1, and may be, for example, the user terminal 2. To be specific, the user terminal 2 can execute the face image replacement process according to the present embodiment by having constituent elements corresponding to the constituent elements of the server 1 as illustrated in FIG. 3.

Additionally, the present technology may also be configured as below.

(1)
An information processing device including:
  a detection unit that detects a face image region in an image;
  a determination unit that determines a human attribute of at least one face image the face image region detected by the detection unit; and
  a face image replacement unit that replaces the at least one face image with a natural face image of another person according to the human attribute determined by the determination unit.

(2)
The information processing device according to (1), wherein the human attribute is at least one of sex, age, race, skin color, and body type of a person.

(3)
The information processing device according to (1), wherein the human attribute is a person's wearing or non-wearing of an accessory including eyewear, a hat, earmuffs, headphones, and earphones.

(4)
The information processing device according to any one of (1) to (3), wherein the face image replacement unit performs replacement with a natural face image of another person according to at least one of size and orientation of the face, and a facial expression of a person of the at least one face image.

(5)
The information processing device according to any one of (1) to (3), wherein the face image replacement unit performs replacement with a natural face image of another person according to a state of illumination during photographing of the image.

(6)
The information processing device according to any one of (1) to (5), wherein the face image replacement unit performs replacement with a natural face image of another person according to a location in which the image is photographed.

(7)
The information processing device according to any one of (1) to (6), wherein the face image replacement unit performs replacement with a natural face image of another person having a same human attribute by comparing the at least one face image and natural face images stored in advance.

(8)
The information processing device according to any one of (1) to (7), wherein the natural face image is a photographed image or a composite image.

(9)
The information processing device according to (8), wherein the composite image is an average face image generated based on face images of a plurality of humans.

(10)
The information processing device according to (8), wherein the photographed image is an actual face image of a person who permits his or her face to be revealed to the public.

(11)
The information processing device according to any one of (1) to (10), wherein the natural face image is an image that includes at least a part of a face.

(12)
The information processing device according to any one of (1) to (11), further including;
  a storage unit that stores the natural face images.

(13)
The information processing device according to any one of (1) to (12), further including:
  a control unit that controls uploading of, on a predetermined service site, an image that is obtained from replacement with a natural face image performed by the face image replacement unit.

(14)
The information processing device according to any one of (1) to (13), wherein the detection unit detects a face image region from an area in the image that is designated by a user.

(15)
The information processing device according to any one of (1) to (14), wherein the detection unit detects a face image region in the image having a size that is greater than or equal to a predetermined size.

(16)
The information processing device according to any one of (1) to (15), wherein the natural face image is marked with an indication that the natural face image is a replaced image.

(17)
The information processing device according to any one of (1) to (16), wherein the face image replacement unit does not perform replacement of a face image when the determination unit is not able to determine the human attribute.

(18)
A non-transitory computer-readable storage medium having a program stored therein, the program causing a computer to operate as:
  a detection unit that detects a face image region in an image;
  a determination unit that determines a human attribute of at least one face image in the face image region detected by the detection unit; and
  a face image replacement unit that replaces the at least one face image with a natural face image of another person according to the human attribute determined by the determination unit.

What is claimed is:

1. An information processing device comprising:
  a detection unit that detects a face image region in an image;
  a determination unit that determines a human attribute of at least one face image in the face image region detected by the detection unit; and
  a face image replacement unit that replaces the at least one face image with a natural face image of another person according to the human attribute determined by the determination unit and also according to a second attribute,
  wherein the second attribute is determined from metadata added to the image when the image is originally captured, and
  wherein the detection unit, the determination unit, and the face image replacement unit are each implemented via at least one processor.

2. The information processing device according to claim 1, wherein the human attribute is at least one of sex, age, race, skin color, hair color, eye color, and body type of a person.

3. The information processing device according to claim 1, wherein the human attribute is a person's wearing or non-wearing of an accessory including eyewear, a hat, earmuffs, headphones, and earphones.

4. The information processing device according to claim 1, wherein the face image replacement unit performs replacement with a natural face image of another person according to at least one of size and orientation of the face, and a facial expression of a person of the at least one face image.

5. The information processing device according to claim 1, wherein the face image replacement unit performs replacement with a natural face image of another person according to a state of illumination during photographing of the image.

6. The information processing device according to claim 1, wherein the face image replacement unit performs replacement with a natural face image of another person according to a location in which the image is photographed.

7. The information processing device according to claim 1, wherein the face image replacement unit performs replacement with a natural face image of another person having a same human attribute by comparing the at least one face image and natural face images stored in advance.

8. The information processing device according to claim 1, wherein the natural face image is a photographed image.

9. The information processing device according to claim 1, wherein the natural face image is a composite image and the composite image is an average face image generated based on face images of a plurality of humans.

10. The information processing device according to claim 8, wherein the photographed image is an actual face image of a person who permits his or her face to be revealed to the public.

11. The information processing device according to claim 1, wherein the natural face image is an image that includes at least a part of a face.

12. The information processing device according to claim 1, further comprising;
   a storage unit including a memory that stores the natural face images.

13. The information processing device according to claim 1, further comprising:
   a control unit that controls uploading of, on a predetermined service site, an image that is obtained from replacement with a natural face image performed by the face image replacement unit,
   wherein the control unit is implemented via at least one processor.

14. The information processing device according to claim 1, wherein the detection unit detects a face image region from an area in the image that is designated by a user.

15. The information processing device according to claim 1, wherein the detection unit detects a face image region in the image having a size that is greater than or equal to a predetermined size.

16. The information processing device according to claim 1, wherein the natural face image is marked with an indication that the natural face image is a replaced image.

17. The information processing device according to claim 1, wherein the face image replacement unit does not perform replacement of a face image when the determination unit is not able to determine the human attribute.

18. A non-transitory computer-readable storage medium having embodied thereon a program stored therein, which when executed by a computer causes the program causing a computer to operate as execute a method, the method comprising:
   a detection unit that detects detecting a face image region in an image;
   a determination unit that determines determining a human attribute of at least one face image in the detected face image region detected by the detection unit; and
   a face image replacement unit that replaces replacing the at least one face image with a natural face image of another person according to the determined human attribute determined by the determination unit and also according to a second attribute,
   wherein the second attribute is determined from metadata added to the image when the image is originally captured.

19. The information processing device according to claim 1, wherein the metadata added to the image when the image is originally captured indicates one or more attributes selected from a group consisting of a state of illumination during capture original image, a location of capture of the original image, and a quality of the original image.

20. The non-transitory computer-readable storage medium according to claim 18, wherein the metadata added to the image when the image is originally captured indicates one or more attributes selected from a group consisting of a state of illumination during capture original image, a location of capture of the original image, and a quality of the original image.

* * * * *